Feb. 14, 1961 U. S. MITCHELL ET AL 2,971,717

DIFFERENTIAL HUB MAGNETIC TAPE REEL

Filed Sept. 16, 1959

INVENTORS
ULYSS S. MITCHELL
ALVA ROBERT MYERS
BY
Lippincott & Ralls
ATTORNEYS

United States Patent Office 2,971,717
Patented Feb. 14, 1961

2,971,717

DIFFERENTIAL HUB MAGNETIC TAPE REEL

Ulyss S. Mitchell, 1150 Yew St., San Mateo, Calif., and Alva Robert Myers, San Francisco, Calif.; said Myers assignor to said Mitchell Filed Sept. 16, 1959, Ser. No. 840,312

5 Claims. (Cl. 242—55.13)

The present invention relates to an improved reel for magnetic tape cartridges or the like, and more particularly, to differentially mounted hubs for such a reel.

In the simultaneous winding and unwinding of magnetic tape during recording or playback of same, it is necessary to provide a constant linear tape velocity which thereby imposes the requirement upon magnetic tape reels of constantly varying angular velocities. As tape is unwound from a reel the tape progressively leaves the reel from a constantly reducing diameter thereof, and this same tape is wound upon a take-up reel at a steadily increasing diameter. It has been found that conventional drive mechanisms are generally unsuited to this purpose because of the very exacting requirements of magnetic tape apparatus. It is well recognized that minute variations in the speed of a magnetic tape passing a recording or playback head will very seriously affect the operation being performed. On the other hand, it is necessary to provide a relatively simple and inexpensive differentially rotatable system, which occupies a very minimum of space and which is sufficiently inexpensive so as to be almost negligible in comparison with the cost of tape employed.

The present invention is directed to the provision of a magnetic tape reel wherein two separately rotatable portions thereof rotate in an evenly varying ratio of angular velocities to thereby accommodate the simultaneous winding and unwinding of magnetic tape upon a single reel. By the utilization of a single reel to supply magnetic tape and to take up the tape, a highly advantageous saving in space requirements of magnetic tape apparatus is achieved. Furthermore, the provision of a double-hub reel precludes the difficulties encountered with single-hub reels employed both as supply and take-up members, for the relative slippage of magnetic tape with respect to itself upon the devices of the latter type causes static and binding of the tape. The magnetic tape reel of the present invention thus provides the advantages of two separate reels without the space disadvantage thereof, while at the same time providing the compactness of a single-reel cartridge without binding of the tape thereon.

Although it is known that differential drive mechanisms may be provided wherein a shaft of one reel or portion thereof is mechanically rotated, it is particularly advantageous in the field of magnetic tape apparatus to provide for the tape itself to be driven as by a capstan, so that the supply and take-up reels of the magnetic tape are rotated in accordance with tape movement, rather than being directly driven. It is with respect to magnetic tape cartridges of the type wherein the magnetic tape is itself drawn across a playback or recording head by means of a capstan and pinch wheel combination, that the present invention is directed. Additionally, the double-hub reel hereof is adapted for reverse rotation, while yet retaining the differential rotational features of the invention. Such reversal is herein accomplished merely by drawing the tape in the opposite direction, and differential rotation of the separate hubs of the single reel hereof automatically rotate in the proper relative angular velocities to rewind the tape upon one reel portion as same is withdrawn from the other portion of the reel.

In brief, the present invention provides a magnetic tape cartridge having a single reel with two separate hubs thereof which are mounted for rotation upon laterally displaced axes. An idler wheel is affixed in pivotal relation to the shaft mounting of each hub of the reel, and is oriented to frictionally engage the interior rim of the hub upon which it is mounted, and to move, upon forced rotation of such hub, into frictional engagement with the shaft of the opposite hub of the reel. Appropriate dimensioning of the idler wheel and of the shaft or rotary members affixed thereto, provides for the desired maximum differential rotational velocity of the two hubs. The frictional engagement of the idler wheel with the hub rims and the shaft of the opposing hub, provides for a smoothly and uniformly varying drive relationship between the hubs, so that magnetic tape or the like, withdrawn from one of the hubs, is evenly wound upon the other hub as same is driven at the appropriate speed from the supply hub.

It is thus an object of the present invention to provide an improved compacted cartridge for magnetic tape supply and take-up, including a double-hub reel having differential and reversible drive means between the hub portions for automatically driving the take-up hub in differential rotational relation to the supply hub.

Various other subsidiary objects of the present invention and advantages of the invention will be apparent to those skilled in the art from the following description of a single preferred embodiment hereof. No limitation is intended by the terms of the following description, but instead, reference is made to the appended claims for a precise delineation of the true scope of the present invention.

The invention is illustrated in the accompanying drawings, wherein.

Figure 1:
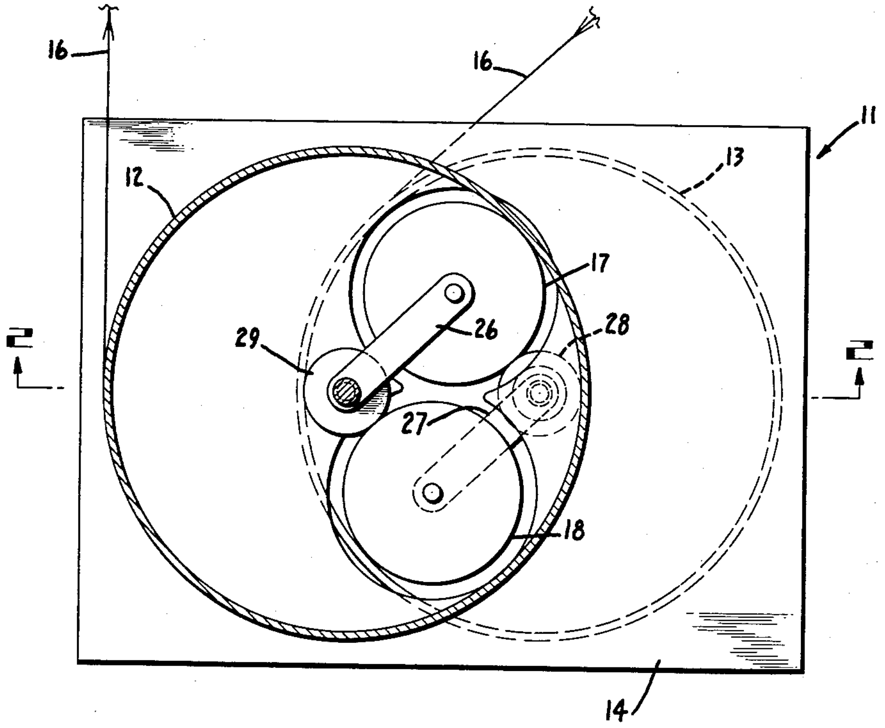
Fig. 1 is a plan view of a magnetic tape cartridge in accordance with the present invention, and having the upper surface of the top hub removed, as indicated by the plane 1—1 of Fig. 2.

Considering now the structural details of the present invention, and referring to the drawings, there will be seen to be illustrated therein a magnetic tape cartridge 11 including a reel formed of upper and lower hubs 12 and 13, respectively, with a central plate 14 therebetween. These hubs 12 and 13 are adapted to have a magnetic tape or wire, or the like, wound thereabout in extension from one of the hubs to the other. Such magnetic tape 16 is preferably secured at opposite ends to the two hubs, and is adapted to extend over appropriate guide means and through drive means such as a conventional capstan and pinch wheel arrangement, as well as across conventional heads adapted to provide playback, recording, and erasing functions. Inasmuch as the present invention relates only to the cartridge and double-hub reel thereof, no illustration or further discussion of apparatus with which the cartridge is adapted to cooperate is herein included, and suitable conventional magnetic tape recording and playback equipment may be utilized to operate upon the magnetic tape 16 extending from the cartridge hereof, and returning to such cartridge. It is, however, to be particularly noted that the magnetic tape drive is provided exteriorly of the cartridge by operation upon the tape itself, as by means of a capstan and pinch wheel arrangement, so that the reel of the cartridge hereof is not driven except in a sense that a portion thereof is forcibly rotated by withdrawing tape therefrom.

As tape is withdrawn from one of the hubs of the reel hereof, and rewound upon the other hub, it is necessary, as noted above, to rotate the hub portions in particular relationship which constantly varies, and same is herein accomplished by the provision of drive means between the hub portions. Such drive means includes a pair of idler wheels 17 and 18 mounted upon the upper and lower hubs, respectively. More specifically, there is provided a first or upper shaft 21 mounted for rotation upon the central plate 14 and extending upwardly therefrom into engagement with the upper hub 12. Such upper hub is rigidly fixed to the mounting shaft 21, and includes a depending rim 22 upon which magnetic tape is adapted to be wound or unwound. The lower hub is likewise mounted by a shaft 23 rotatably secured to the central plate 14 in depending relation therefrom and fixed to the lower hub at the center thereof, whereby such lower hub is freely rotatable. There is also provided a rim 24 about the lower hub 13, and extending toward the upper hub so as to afford a surface for the winding and unwinding of magnetic tape on the lower hub. The upper idler wheel 17 is mounted for rotation upon a pivot arm 26 secured to the shaft 21 in pivotal relationship thereto, and carrying by suitable bearing means the idler wheel 17 in rotatable relation and in dependency therefrom. The lower idler wheel 18 is rotatably mounted upon a second pivot arm 27, which is, in turn, mounted upon the lower shaft 23 to freely pivot thereabout.

Figure 2:
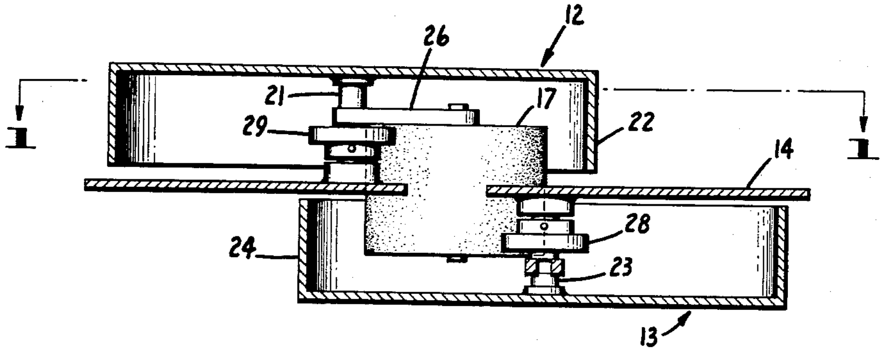
Fig. 2 is a sectional view of the magnetic tape cartridge hereof, taken in the plane 2—2 of Fig. 1.

Differential drive is herein afforded by frictional engagement of the idler wheels with the rim of the hub with which the idler wheel is associated, and simultaneous frictional engagement of such idler wheel with the shaft of the opposite hub. Thus, as illustrated in Fig. 2, the upper idler wheel 17 will be seen to extend downwardly through an appropriate opening in the central plate 14 into position for frictional engagement with a disc 28 affixed to the lower shaft 23 of the lower hub. The upper idler arm 26 is appropriately dimensioned along with the diameter of the upper idler wheel 17, so that such idler wheel does frictionally engage the interior surface of the rim 22 of the upper hub 12. In other words, the length between centers of the pivot arm 26, together with the radius of the idler wheel 17, is equal to the radius of the upper hub 12. Furthermore, the radius of the upper idler wheel 17 is made substantially greater than the radius of the lower shaft disc 28, with which such idler wheel is adapted to frictionally engage for imparting rotational motion. It is preferred that a drive ratio of about two and one-half to one shall be afforded by the frictional engagement of the idler wheel 17 with the rim of the hub thereof and with the disc 28, so that the circumference of the idler wheel 17 should be made about two and one-half times as great as the circumference of such disc 28. A reverse drive relationship is attained by the lower idler wheel 18 which extends upwardly through appropriate opening in the central plate 14 into frictional engagement with a disc 29, secured to the upper shaft 21. The above discussion regarding the upper idler wheel 17 is equally applicable to the lower idler wheel 18, insofar as orientation and dimension are concerned.

Operation of the above-described embodiment of the present invention is substantially automatic, and follows directly from the withdrawing of tape 16 from the hub upon which tape is initially wound. Thus, for example, if it be considered that tape is initially wound upon the upper hub 12 so that same constitutes the supply portion of the reel, such tape is withdrawn therefrom by tape drive means exteriorly of the cartridge 11. Tape is withdrawn at a constant linear tape velocity, so as to thereby rotate the upper hub 12. As the upper hub 12 rotates in a clockwise direction, as viewed in Fig. 1 of the drawings, the idler wheel 17 engaging the inner surface of the hub rim 22 will thus be moved in a clockwise direction into contact with the disc 28 upon the lower hub shaft 23. The idler wheel 17 pivots into this position wherein further pivoting is not possible, and is then frictionally rotated by engagement with the inner circumference of the hub rim 22, and, in turn, frictionally drives the disc 28 so as to thereby rotate the lower hub 13. The initial drive ratio between the upper and lower hubs is determined by the relative diameters of the idler wheel 17 and lower hub disc 28, and same is preferably about two and one-half to one. As tape is withdrawn from the upper hub, the lower hub will thus be seen to rotate at a much greater angular velocity, so as to compensate for the difference in radius at which the tape is withdrawn from the upper hub, and the radius at which tape is wound upon the lower hub. Continued unwinding of tape from the supply hub 12, and winding of tape upon the take-up hub 13, in this example, uniformly varies the ratio of radii, and consequently requires a uniform variation in the differential rotational velocity of the two hubs. Such is herein afforded by slippage in the frictional differential drive arrangement including the idler wheel 17 and disc 28. Consequently, as tape is wound upon the lower hub 13, the relative rotational velocity of the latter decreases, and an increasing slippage of the frictional drive arrangement occurs until the tape is substantially entirely wound upon the lower hub 13, at which time the upper hub 12 will be seen to be rotating at substantially two and one-half times the rotational velocity of the lower hub.

Reversing of the drive mechanism to withdraw tape from the lower hub 13 and to feed same onto the upper hub 12, causes the lower hub to be rotated in a clockwise direction, in distinction to the above example wherein same was rotated in a counterclockwise direction to take up magnetic tape. As the lower hub 13 rotates in a clockwise direction, the idler wheel 18 thereof pivots around the hub shaft upon the pivotal mounting arm 27 until such idler wheel engages the drive disc 29 of the upper hub. In this position the idler wheel 18 is frictionally engaged by the inner surface of the lower hub rim 24 and also by the periphery of the upper hub drive disc 29, so that there is imparted to the upper hub a rotational drive force through this frictional drive means. Rotation of the lower hub 13 in a clockwise direction causes the idler wheel 18 to also rotate in a clockwise direction whereby the upper hub drive disc 29 is rotated in a counterclockwise direction, and consequently, the upper hub 12 will be seen to rotate in a counterclockwise direction so as to wind tape thereupon, and the ratio of rotation of the upper hub to the lower hub is determined by the relative diameters of the idler wheel 18 and drive disc 29. Rotation in this direction will be seen to move the upper hub idler wheel 17 out of engagement with the lower hub drive disc 28 so that drive is provided between the hubs of the reel in but a single direction at a time, and no binding or interference with desired differential drive occurs.

It is not necessary with the magnetic tape cartridge of the present invention to move or operate any portion thereof in order to achieve reverse differential drive relationship, for the idler wheels 17 and 18 move into and out of frictional drive engagement, in accordance with the direction which either of the hubs is forced to rotate in accordance with the withdrawing of tape therefrom. There is thus afforded an automatic reversing feature wherein a desired differential drive relationship is provided between the hub portions of the reel for either direction of rotation thereof, and furthermore, wherein such drive relationship varies uniformly from one extreme to another without binding or interference which might otherwise tend to prevent the magnetic tape from being moved at a uniform rate across playback or recording heads.

We claim:

1. A magnetic tape cartridge comprising a pair of hubs having rims thereabout and engaging separate shafts for rotation therewith, means mounting said shafts in parallel axially offset relation, a first arm pivotally engaging the shaft of a first of said hubs, a first idler wheel rotatably mounted upon said first arm and extending into rolling contact with the rim of said hub and into contact with the shaft of the other hub for rotating the latter in response to rotation of said first hub, a second arm pivotally engaging the shaft of said other hub, and a second idler wheel rotatably mounted upon said second arm and extending into rolling contact with the rim of said other hub and into contact with the shaft of said first hub for reverse drive.

2. An improved magnetic tape cartridge as claimed in claim 1, further defined by the length between centers of each of said pivot arms plus the radius of the attached idler wheel being substantially equal to the radius of each hub.

3. An improved double-hub reel for magnetic tape comprising first and second hubs with rims thereabout, first and second shafts secured to said first and second hubs, respectively, and oriented in parallel axially offset relation disposing the hubs with the rim thereof in facing relation, first and second like arms pivotally connected to said first and second shafts, respectively, and a pair of friction wheels rotatably mounted upon separate ones of said arms in rolling contact with the rim of the hub upon which the wheel is mounted and pivotable into substantially tangential frictional engagement with the shaft of the opposite hub, whereby driven rotation of one hub pivots the friction wheel attached thereto into drive relation with the shaft of the other hub for driving the latter.

4. An improved single-reel cartridge for magnetic tape comprising first and second hubs having rims thereabout for accommodating the unwinding of tape from one onto the other, a pair of shafts affixed one to each hub at the center thereof, means rotatably mounting said shafts in parallel extension toward each other and in axially offset relation whereby said hubs are laterally offset, a pair of idler wheels having a diameter in excess of the diameter of said shafts, and a pair of arms pivotally connected one to each of said shafts and each rotatably mounting one of said idler wheels in extension from the shafts to frictionally engage the rim of the hub upon which the wheel is mounted, whereby forced rotation of either hub by withdrawing magnetic tape wound thereon rolls the idler wheel thereof around the hub rim to frictionally rotate the other shaft in the opposite direction, and at a greater angular velocity for the winding of magnetic tape upon the other hub.

5. An improved single-reel cartridge for magnetic tape comprising first and second hubs having rims about facing sides thereof for accommodating the winding of tape thereon, first and second shafts affixed to the centers of said first and second hubs, respectively, an apertured central plate disposed between said hubs and rotatably mounting said shafts in parallelism on opposite sides of said plate, with said shafts being disposed in axially offset relation whereby said hubs are also laterally offset, a pair of drive discs disposed one about each of said shafts in fixed relation thereto for rotation therewith, first and second idler wheels disposed between said hubs in extension through an opening in said central plate, a first arm pivotally connected to said first shaft and rotatably mounting said first idler wheel in position to frictionally engage the inner surface of the rim of the first of said hubs, a second arm pivotally connected to said second shaft and rotatably mounting said second idler wheel in position to frictionally engage the inner surface of the rim of the second of said hubs, said idler wheels having a greater diameter than said drive discs, whereby forced rotation of either of said hubs by the withdrawing of magnetic tape therefrom rolls the idler wheel thereof about the inner hub rim into frictional engagement with the drive disc of the opposite hub to thereby rotate such opposite hub at in initial angular velocity substantially greater than the angular velocity of the driven hub, with such raito varying with the unwinding of tape from the first hub and winding of same upon the second by slippage at the frictional contact of the idler wheel with the hub rim and drive disc of the other hub.

No references cited.